United States Patent [19]

Leopold

[11] Patent Number: 4,688,135

[45] Date of Patent: Aug. 18, 1987

[54] DUPLEX ELECTRICAL RECEPTACLE WITH REPLACEABLE SURGE SUPPRESSOR

[75] Inventor: Howard S. Leopold, Plainview, N.Y.

[73] Assignee: Eagle Electric Mfg. Co., Inc., Long Island City, N.Y.

[21] Appl. No.: 894,955

[22] Filed: Aug. 8, 1986

[51] Int. Cl.[4] .............................................. H02H 1/04

[52] U.S. Cl. .................................... 361/118; 340/638; 340/656; 361/56; 361/111; 361/395; 439/577; 439/622

[58] Field of Search ................. 361/56, 110, 111, 117, 361/118, 393–395; 340/638, 656; 339/147 R, 147 P

[56] References Cited

U.S. PATENT DOCUMENTS

| | | | |
|---|---|---|---|
| 3,742,414 | 6/1973 | Gittin et al. | 339/147 P X |
| 3,840,781 | 10/1974 | Brown | 361/111 |
| 4,001,803 | 1/1977 | Lombardo | 340/656 |
| 4,191,985 | 3/1980 | Phillips, Jr. | 340/638 X |
| 4,217,619 | 8/1980 | Tibolla | 361/11 X |
| 4,380,038 | 4/1983 | Roudeau | 361/118 X |

*Primary Examiner*—A. D. Pellinen

*Assistant Examiner*—Jeffrey A. Gaffin

*Attorney, Agent, or Firm*—Kirschstein, Kirchstein, Ottinger & Israel

[57] ABSTRACT

A duplex electrical receptacle has a replaceable module on-board which surge-suppressing components are mounted for replacement in the event of surge-suppression failure. An auditory alarm sounds to alert an operator to surge-suppression failure.

12 Claims, 5 Drawing Figures

FIG. 1
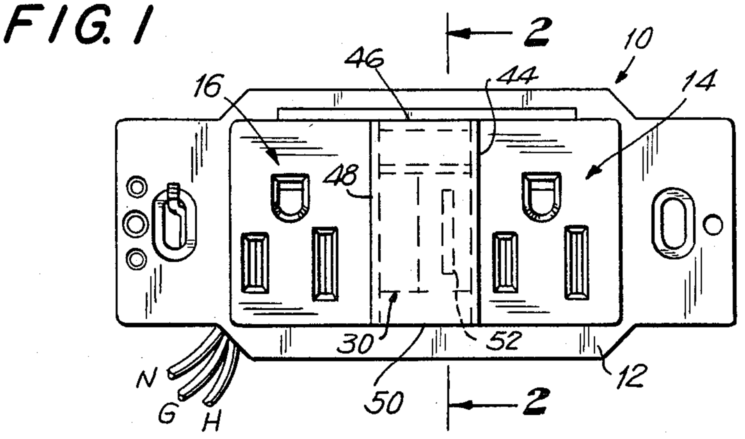
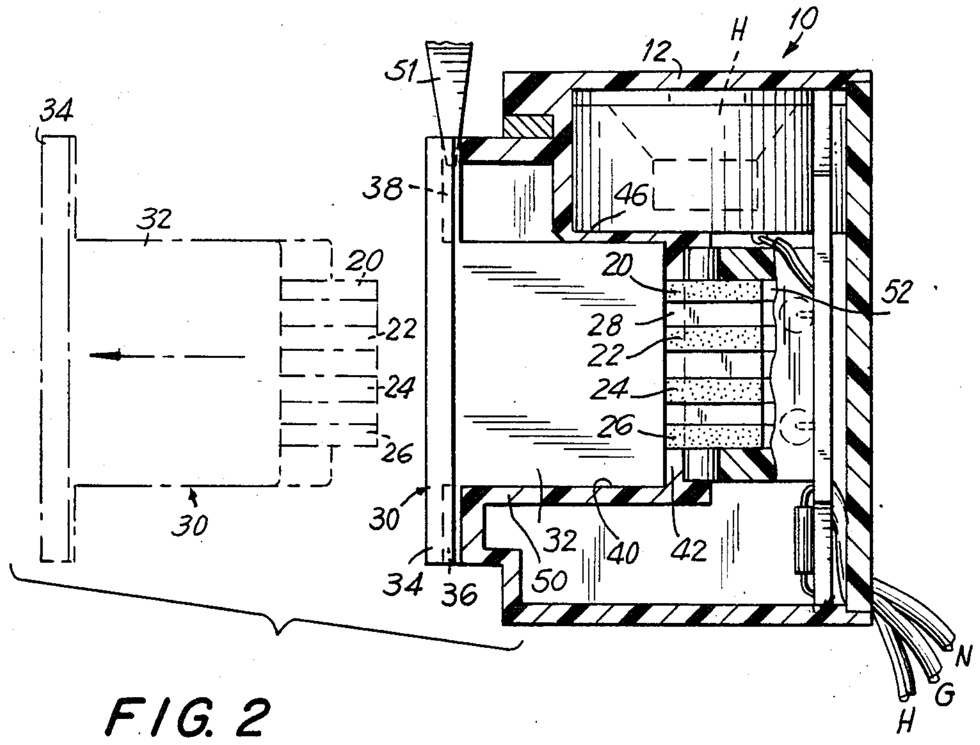
FIG. 2

FIG. 3
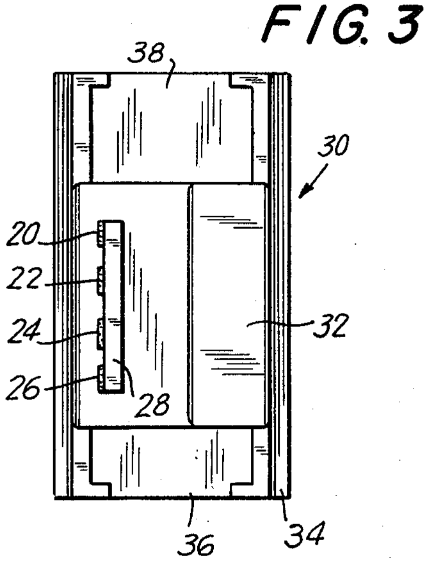
FIG. 4
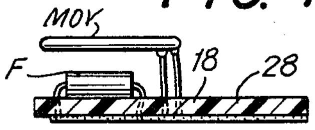
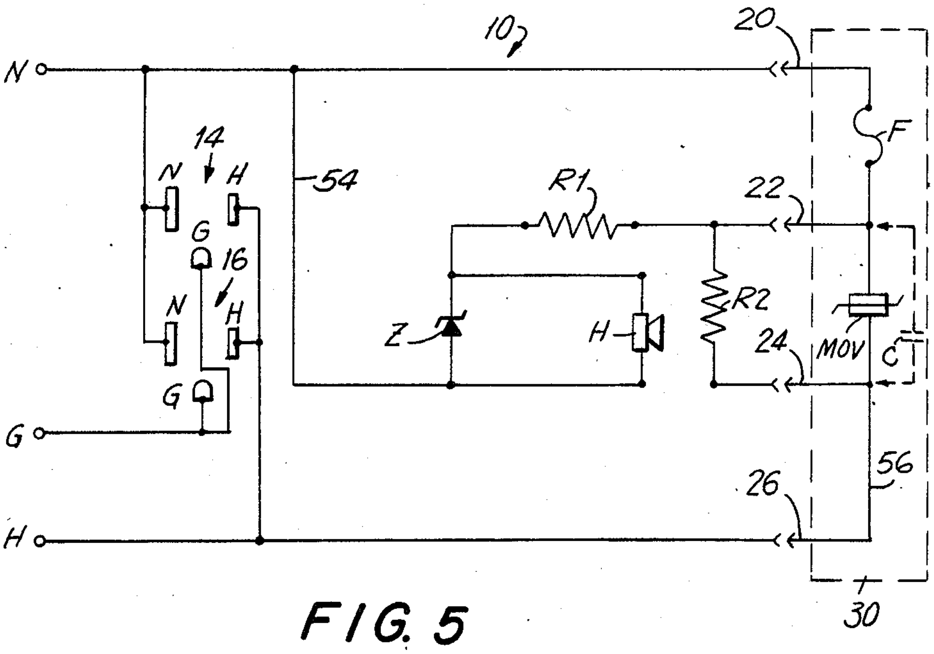
FIG. 5

DUPLEX ELECTRICAL RECEPTACLE WITH REPLACEABLE SURGE SUPPRESSOR

BACKGROUND OF THE INVENTION

1. Field of the Invention

This invention generally relates to duplex electrical receptacles having surge-suppressors for protecting electrical devices plugged into the receptacles from transient line voltage surges and, more particularly, to a replaceable surge-suppressor having an audible failure indicator.

2. Description of Related Art

Electrical receptacles having multiple electrical outlets arranged on so-called power strips or power packs have heretofore been proposed with built-in surge-suppressors operative for protecting electrical devices plugged into the outlets from transient line voltage surges. A typical surge-suppressor comprises a metal oxide varistor. High voltage surges are clamped by the varistor to safer lower voltage levels. A fuse is electrically connected in series with the varistor, and is intended to prevent the varistor from exploding in the event of varistor failure.

Usually, a surge-protected receptacle is flush-mounted with a room wall and, more often than not, is concealed from direct view by being positioned behind a desk or a piece of furniture. In any event, upon failure of the surge-suppressor, the entire receptacle must be replaced, which can be a time- and labor-intensive procedure and, as a result, surge-suppressor failure is often ignored.

Sometimes, the surge-protected receptacle is provided with a pilot light which visually indicates the status of the surge-suppressor. The pilot light is operatively connected to the suppressor. When the pilot light is lit, this indicates that the surge-suppressor is functioning. When the pilot light is extinguished, this indicates that the surge-suppressor is inoperative, and that there is no protection for the electrical device plugged into the receptacle. In those circumstances where the pilot light is concealed from direct view, the extinguishing of the pilot light may not be readily noticed, with the result that, even though the electrical device plugged into the receptacle continues to operate, surge protection has been lost without the operator of the electrical device having been alerted to the loss of surge protection. This could result in damage to the electrical device.

SUMMARY OF THE INVENTION

1. Objects of the Invention

It is a general object of this invention to overcome the aforementioned drawbacks of prior art surge-protected receptacles.

It is another object of this invention to provide a replaceable surge-suppressor mounted on-board a plug-in module which is mountable on, and removable from, an electrical receptacle.

It is a further object of this invention to easily, conveniently and quickly replace a failed surge-suppressor in the field without laborious and expensive assembly procedures.

Yet another object of this invention is to reliably broadcast an audible alarm upon failure of the surge-suppressor, which alarm will not stop until removal of the replaceable plug-in module, thereby alerting the operator, in a manner not easily ignored, to the existence of the failed surge-suppressor.

Still another object of this invention is to eliminate the prior art necessity of replacing the entire surge-protected receptacle in the event of surge-suppressor failure, and to reduce the time, expense and labor costs involved in such replacement.

A still further object of this invention is to reduce the risk of damage to electrical devices plugged into the receptacle, particularly electronic equipment such as computers.

2. Features of the Invention

In keeping with these objects, and others which will become apparent hereinafter, one feature of this invention resides, briefly stated, in a replaceable surge-suppressor arrangement comprising an electrical receptacle having an electrical outlet connected to line voltage. The outlet has electrical sockets for receiving an electrical plug of an electrical device to be protected from transient line voltage surges. The receptacle has electrically-insulating walls bounding a cavity. In a preferred embodiment, the receptacle is a duplex receptacle having two electrical outlets spaced apart from each other, in which event, the aforementioned cavity is preferably located between the outlets.

The arrangement further comprises a replaceable module of electrically-insulating material. The module is movable between a plugged-in state in which the module is inserted into the cavity, and a removed state in which the module is removed from the cavity. Surge-suppressing means, e.g. a metal oxide varistor, is mounted on-board the module for joint movement therewith. The surge-suppressing means is operative in the plugged-in state for protecting the electrical device from transient line voltage surges.

The arrangement still further comprises malfunction sensor means, e.g. a fuse electrically connected in series with the varistor. The fuse is mounted on-board the module for joint movement therewith. The fuse is operative in the plugged-in state for detecting a malfunction of the surge-suppressing means.

The arrangement yet further comprises failure indicator means, e.g. a zener diode and a horn, mounted in the receptacle. The horn which is powered by the zener diode is operative in the plugged-in state, in response to detection of the malfunction by the fuse, for alerting a user, by emitting an audible alarm or signal, to the existence of the malfunction and the need to remove the module from the cavity for replacement of the surge-suppressing means and the malfunction sensor means.

Hence, in accordance with the invention, a failed surge-suppressing means may be interchanged with an operative one in a quick, easy and convenient manner without having to undergo extensive and expensive labor procedures. Also, the audible alarm is not easily ignored, with the result that the operator will be affirmatively prompted to effect replacement of the surge-suppressing means and, hence, avoid the possibility of doing damage to the electrical device.

Another feature of this invention is embodied in mounting the varistor and the fuse on a printed circuit board within the module such that an extension of the board extends beyond the module, thereby defining an edge connector. This edge connector is snugly received in a correspondingly-contoured edge socket formed in the cavity within the receptacle.

The module itself engages the walls bounding the cavity with a snug fit in order to prevent the module from falling out of the cavity. To remove the module, it is advantageous if fingernail-receiving or tool-receiving notches are formed on the module to assist the operator in prying the module out of its cavity to effect replacement.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 1 is a top plan view of a replaceable surge-suppressor arrangement in accordance with this invention;

FIG. 2 is a sectional view in enlarged scale taken on line 2—2 of FIG. 1, and also showing in phantom lines the removal of the module from the receptacle;

FIG. 3 is a rear view of the module;

FIG. 4 is an isolated view of surge-suppressor components mounted on a printed circuit board prior to being mounted on-board the module; and FIG. 5 is an electrical schematic diagram of the electrical circuit in accordance with this invention.

DETAILED DESCRIPTION OF THE PREFERRED EMBODIMENTS

Referring now to the drawings, reference numeral 10 generally identifies a replaceable surge-suppressor arrangement, including an electrical receptacle 12 having advantageously, but not necessarily, a pair of electrical outlets 14, 16 spaced apart from each other lengthwise of the receptacle. More or fewer than two outlets could be provided. Each outlet has conventional hot, neutral and ground electrical sockets arranged in conventional manner to receive correspondingly-contoured prongs of an electrical plug of an electrical device such as a computer to be protected, as described below, from transient line voltage surges. The sockets of each outlet are advantageously dimensioned to accept a polarized plug having a grounding pin, although this is not a necessary feature of this invention.

The duplex receptacle 12 includes a housing made of electrically-insulating material. Conventional electrically-conducting hot, neutral and ground terminal strips are mounted within the receptacle housing. Each terminal strip has contact portions underneath the sockets. Upon insertion of the plug prongs into the respective sockets, the prongs make electromechanical contact with said contact portions. Electrical wires H, N, G are connected at one end to a non-illustrated electrical power source, e.g. 120v AC. These electrical wires enter the receptacle housing and are electrically connected at their opposite ends to the hot, neutral and ground terminal strips, respectively. Thus, line voltage enters the receptacle 12 along these wires and, from time to time, transient voltage surges are generated on the wires, which surges, if not controlled, can damage the electrical device(s) plugged into either or both sockets.

This surge control is obtained by a surge-suppressor which, as shown in FIGS. 4 and 5, comprises a metal oxide varistor MOV. The varistor, as shown in FIG. 4, is mounted on one side of a printed circuit board 18, the opposite side of which is plated with four conductive leads (see FIG. 2) 20, 22, 24, 26.

A malfunction sensor means comprising a fuse F is electrically connected in series with the varistor and physically mounted on the same one side of the board 18. In the event of varistor failure, the varistor almost invariably shorts, thereby causing an electrical current of large magnitude to flow therethrough, the magnitude being sufficient to cause the varistor, under certain circumstances, to explode. The fuse is operative to prevent such explosions by blowing and interrupting the current flow through the varistor beforehand. Hence, the blowing of the fuse serves to detect varistor malfunction.

The fuse-varistor-circuit board subassembly of FIG. 4 is mounted on-board a replaceable module 30 constituted of electrically-insulating material such as resilient, synthetic plastic material. The module 30 includes a main body 32 in which the fuse and varistor are confined, and a handle 34 at one end of the main body 32. The handle 34 is so dimensioned as to enable an operator to conveniently grasp and manipulate the module. Notches 36, 38 are formed on opposite ends of the handle 34 for a purpose described below. An extension 28 of the circuit board 18 extends outwardly of the main body 32 to expose ends of the leads 20, 22, 24, 26.

Referring to FIG. 2, a cavity 40 is formed in the receptacle, preferably intermediate the outlets 14, 16. The cavity 40 is dimensioned to snugly receive the module 30 when the latter is inserted therein, thereby defining a so-called plugged-in state. The receptacle 12 has a cavity base wall 42, and a set of cavity side walls 44, 46, 48, 50 extending generally perpendicularly to the base wall 42. An edge connector socket 52 is formed through the base wall 42, and is so dimensioned as to snugly receive the aforementioned board extension 28 in the plugged-in state of the module. The outer dimensions of the module 30 are of complementary contour to the inner dimensions of the cavity 40 so that a good, snug, friction-fit is obtained in the plugged-in state.

The aforementioned notches 36, 38 in the handle 34 serve as convenient tool-receiving or fingernail-receiving notches. Thus, an operator may insert his fingernail or a tool 51 to aid the operator in removing the module from the cavity 40, thereby defining a so-called removed state (as shown in phantom lines in FIG. 2) to permit module replacement.

Referring now to FIG. 5, the fuse and the varistor in the plugged-in state of the module are electrically connected across the hot and neutral wires via the edge connection made between the board extension 28 and the edge socket 52. High voltage surges across the hot and neutral wires are clamped by the varistor to safer, lower voltage levels.

Hence, in the event of varistor failure, as described above, the fuse blows, and a large voltage appears across the fuse and across the leads 20, 22. This large or open circuit voltage, e.g. on the order of 120 v AC, is conducted along conductor 54 to failure indicator means comprising a zener diode Z and a horn H. The zener diode has an anode which is connected by conductor 54 to lead 20 in the plugged-in state of the module. The cathode of the zener diode is connected via resistor R1 to lead 22 in the plugged-in state. The zener diode is operative to rectify and clamp the open circuit voltage to a much reduced clamping voltage of about 5 volts DC. If desired, a half- or full-wave bridge rectifier can be connected upstream of the zener diode to rectify the AC voltage to DC voltage. In addition, a capacitor may be connected across the anode and cathode of the zener diode to help smooth out ripples in the clamping voltage.

The failure-indicator means are mounted in the receptacle, and are operative in the plugged-in state in response to detection of the varistor malfunction for alerting an operator to the existence of the malfunction and the need to remove the module 30 from the cavity 40 for replacement of the varistor. The zener diode powers the horn H or speaker to emit an audible signal, thereby. warning the operator that the surge-suppressing means has malfunctioned and must be replaced. The sounding of the horn constitutes a constant, not-easily-ignored reminder to the operator.

A resistor R2 is connected across leads 22, 24. The resistor R2 ensures that the zener diode and the horn remain operative in the event that the varistor does not remain shorted after the varistor fails.

A shortcircuit shunt 56 is provided across leads 24, 26. The shunt 56 ensures that the zener diode and the horn are energizeable. In the removed state of the module 30, the shunt 56 is, of course, also removed and, as a result, the horn cannot be powered. Thus, the horn broadcasts a sound alarm, preferably of a high enough decibel level so that the sound cannot be ignored. The only way to silence the alarm is to remove the module from the cavity.

Referring again to FIG. 5, a capacitor C may optionally be electrically connected in parallel across the varistor. The capacitor is advantageously mounted onboard the module 30, although, under some circumstances, the capacitor could be mounted on the receptacle. The function of the capacitor is to filter excess noise, e.g. RFI and/or EMI, and thereby help to protect the electrical device plugged into the receptacle from such excess noise.

It will be understood that each of the elements described above, or two or more together, also may find a useful application in other types of constructions differing from the types described above.

While the invention has been illustrated and described as embodied in a duplex electrical receptacle with replaceable surge-suppressor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the following claims:

1. A replaceable surge-suppressor arrangement, comprising:

(a) an electrical receptacle having an electrical outlet connected to line voltage and having electrical sockets for receiving an electrical device to be protected from transient line voltage surges, said receptacle having electrically-insulating walls bounding a cavity;

(b) a replaceable module of electrically-insulating material, and movable between a plugged-in state in which the module is inserted into the cavity, and a removed state in which the module is removed from the cavity;

(c) surge-suppressing means mounted on-board the module for joint movement therewith, and operative in the plugged-in state, for protecting the device from transient line voltage surges;

(d) malfunction-sensor means operative in the plugged-in state, for detecting a malfunction of the surge-suppressing means; and (e) failure-indicator means operative in the plugged-in state in response to detection of the malfunction, for alerting a user to the existence of the malfunction and the need to remove the module from the cavity for replacement of the surge-suppressing means.

2. The surge-suppressor arrangement as recited in claim 1, wherein the surge-suppressing means includes a varistor, and wherein the malfunction-sensor means includes a fuse electrically connected in series with the varistor, both the varistor and the fuse being mounted on-board the module and on a printed circuit board having an extension extending beyond the module, the board having electrical conductors on the extension.

3. The surge-suppressor arrangement as recited in claim 2, wherein the receptacle includes an edge socket in communication with the cavity, and dimensioned to receive the extension in the plugged-in state.

4. The surge-suppressor arrangement as recited in claim 1, wherein the failure-indicator means are mounted in the receptacle.

5. The surge-suppressor arrangement as recited in claim 4, wherein the failure-indicator means includes a conditioning element for limiting the magnitude of the line voltage to a predetermined value.

6. The surge-suppressor arrangement as recited in claim 4, wherein the failure-indicator means includes a conditioning element for rectifying AC line voltage to DC voltage.

7. The surge-suppressor arrangement as recited in claim 4, wherein the failure-indicator means includes an auditory alarm for broadcasting sound in response to detection of the malfunction, said broadcast sound being silenced in the removed state of the module.

8. The surge-suppressor arrangement as recited in claim 1, wherein the module includes handle means for permitting the user to manually move the module between the plugged-in and removed states, and access means for enabling the user to gain access to the handle means.

9. The surge-suppressor arrangement as recited in claim 1, wherein the module is dimensioned to snugly fit in the cavity in the plugged-in state.

10. The surge-suppressor arrangement as recited in claim 1, wherein the receptacle has two electrical outlets, and wherein the cavity is located between the outlets.

11. The surge-suppressor arrangement as recited in claim 1; and further comprising filter means mounted on-board the module for joint movement therewith, and operative for filtering noise.

12. An auditory, failure-indicating, replaceable surge-suppressor arrangement, comprising:

(a) an electrical duplex receptacle having a pair of spaced-apart electrical outlets connected to line voltage, each outlet having electrical sockets for receiving an electrical device to be protected from transient line voltage surges, said duplex receptacle having electrically-insulating walls bounding a cavity located between the outlets;

(b) a replaceable module of electrically-insulating material, and movable between a plugged-in state in which the module is inserted into the cavity, and a removed state in which the module is removed from the cavity;

(c) surge-suppressing means mounted on-board the module for joint movement therewith, and operative in the plugged-in state, for protecting a respective device from transient line voltage surges;

(d) malfunction-sensor means mounted on-board the module for joint movement therewith, and operative in the plugged-in state, for detecting a malfunction of the surge-suppressing means; and (e) failure-indicator means mounted in the receptacle, and operative in the plugged-in state in response to detection of the malfunction, for broadcasting sound to alert a user to the existence of the malfunction and the need to remove the module from the cavity for replacement of the surge-suppressing means, the removal of the module terminating the sound broadcast.

* * * * *